Jan. 15, 1957  A. B. KAUFMAN  2,777,640
TEMPERATURE CONTROL CIRCUIT
Filed Oct. 19, 1953
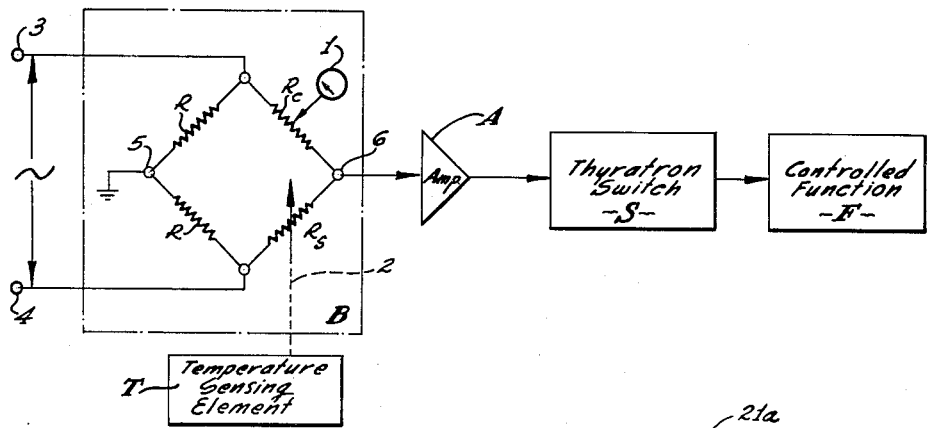
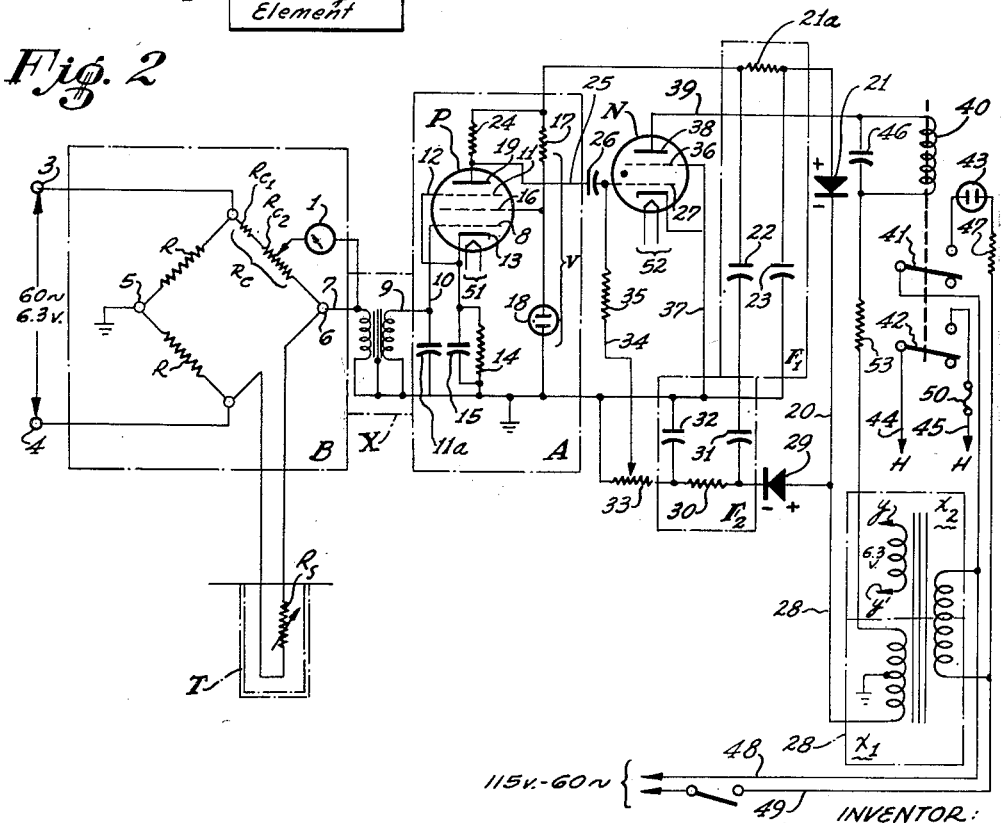
INVENTOR:
Alvin B. Kaufman
By Herbert E. Metcalf
His Patent Attorney

United States Patent Office 2,777,640
Patented Jan. 15, 1957

2,777,640

TEMPERATURE CONTROL CIRCUIT

Alvin B. Kaufman, Los Angeles, Calif., assignor to Northrop Aircraft, Inc., Hawthorne, Calif., a corporation of California Application October 19, 1953, Serial No. 387,005

5 Claims. (Cl. 236—78)

This invention relates to temperature control circuits and, more particularly, to a thyratron control switch which is operated by sensed temperature variations applied to an alternating current Wheatstone bridge.

The null-seeking characteristic of a bridge servo circuit renders it useful in a multitude of automatic control applications. A parameter to be regulated as temperature, for example, can be utilized to effect resistance variations in a bridge circuit, consequently altering the degree of unbalance of this circuit. This circuit unbalance can then be detected and used in a servo loop to restore desired temperature conditions.

Of course, the control of temperature is among the more common applications of feedback control. But prior applications of bridge circuits to temperature control have manifested some notable disadvantages, among which are poor regulation tolerances, poor reliability and undue circuit complexity.

It is, accordingly, an object of this invention to provide a temperature control means of maximal accuracy and reliability and of minimal complexity.

More specifically, it is an object of this invention to provide a temperature controller which will handle a range of $-60°$ F. to $+400°$ F. with an accuracy of $\pm \frac{1}{4}°$ F.; of course, with modifications in parameters in the bridge circuit, the range can be modified in accordance with operational requirements.

In order to accomplish the foregoing objects, an alternating current Wheatstone type bridge is utilized to control the grid bias of a thyratron tube. A suitable probe— a Balco temperature sensitive element, for example, is connected as a resistive element in the bridge circuit. Adjacent to this probe resistive element is a temperature control—a dial controlled helical potentiometer, for example; this potentiometer can be adjusted to a resistance magnitude that is higher than that of the probe; this resistance differential corresponds to a required temperature increase, for example. The resulting unbalance of the bridge circuit effects development of an alternating current signal; this signal is amplified by a pentode tube, and then applied to the grid of a thyratron. The resulting voltage which appears on the grid of the thyratron is in phase with the plate voltage thereof; consequently the tube commences to conduct. This action effects current flow through a relay coil, thus closing a relay connected across the "on" switch of a heating device. The heating device is, as a result, turned on and the resulting heating of the air or liquid bath surrounding the temperature probe effectively alters (increases) the resistance thereof. When the magnitude of resistance of the temperature probe attains the same value as that of the control potentiometer, the bridge circuit is balanced and the thyratron consequently extinguished; the heating device is therefore turned off. The cycle is, of course, repeated when the temperature of the controlled medium is lowered by the loss of heat through chamber walls, or from introduction of cooling, for example. It is to be noted that the ability of the circuit to control temperature without wide fluctuations and with negligible overshoot arises from the combination of an extremely sensitive temperature probe with suitable control amplifier circuitry, and proper heater and chamber configuration.

In a similar manner, the bridge circuit can be utilized to control cooling temperatures; this process can be initiated merely by adjusting the resistance magnitude of the helical potentiometer to a value that is lower than that of the sensitive temperature probe. Under these conditions, bridge unbalance occurs in a direction opposite to that previously described; consequently a 180° out-of-phase signal appears on the grid of the thyratron which therefore does not fire. The effect of this action can be utilized to turn on a cooling device which will tend to restore the controlled medium to the desired temperature conditions. Should the medium be cooled to such a degree that the resistance of the sensitive probe is less than that of the control potentiometer, the previously explained cycle of events is repeated.

The previously mentioned objects and features will be more fully understood and other objects will become apparent by reference to the following detailed description read in conjunction with the accompanying drawings wherein:

Figure 1 is a combination block-schematic diagram, typical of a general embodiment of the invention.

Figure 2 is a schematic diagram of a preferred embodiment of the invention.

Figure 1 is a combination block-schematic diagram, illustrative of general operational principles of the invention. Wheatstone bridge B comprises a first branch having two adjacent arms, each having a resistor R therein, the magnitude of both these resistors being substantially equal, and a second branch having two adjacent arms; the first arm includes control potentiometer $R_c$, the magnitude which is adjusted by means of dial 1 and the second arm includes balancing resistance $R_s$, the magnitude of which is adjusted by means of temperature sensing element T as indicated by dotted line 2. Bridge B is energized by an alternating current signal across terminals 3 and 4. Node 5 is grounded. Output from bridge B is taken from node 6.

An output signal appears at node 6 only under conditions of bridge unbalance. The phase of the resulting alternating current voltage signal is dependent upon direction of bridge unbalance i. e. the output signal developed when the magnitude of balancing resistance $R_s$ is greater than that of control potentiometer $R_c$ differs in phase by 180° from the output signal developed when the magnitude of balancing resistance $R_s$ is less than that of control potentiometer $R_c$.

Thus bridge circuit B acts as a form of phase discriminator whose output, amplified by means of amplifier A, can be utilized to control the conduction status of thyratron switch S which, in turn, provides operational orders to controlled function F.

The nature of controlled function F can assume a multitude of forms. For example, thyratron switch S can be used to control the "on-off" status of a heater, a cooler or of liquid flow. Or it might be utilized as a sensitive measuring device for temperature or some proportional function as true air speed, for example, which is directly proportional to the rise of pitot temperature above static temperature.

Other possible uses of thyratron switch S in conjunction with controlled function F include protective applications as automatic cut off, for example, and alarm applications as a fire warning indicator, for example. Thus there is presented in Figure 1 a temperature-controlled servo-system of simplicity, versatility and reliability.

Figure 2 is a schematic diagram of a preferred embodiment of the invention which is, in this specific case, utilized to control the "on-off" status of a heater. Wheatstone bridge circuit B has a 6.3 volt, 60 cycle voltage applied across terminals 3 and 4. A fixed resistor R is included in each leg of the first branch. Helical potentiometer $R_c$, comprising range limiting resistance $R_{c_1}$ and adjustable resistance $R_{c_2}$, controlled by dial 1, and balancing resistance $R_s$, controlled by temperature sensitive element T—a Balco type, for example, comprise the second branch. Node 5 completes the ground connection. Any output appears at node 6 and is conveyed, via lead 7 to voltage gain (and impedance matching) transformer X which increases the amplitude of the original signal approximately 30 times; thus an amplified alternating current signal is conveyed from voltage gain transformer X to control grid 8 of pentode P—a type 6AU6, for example, via leads 9 and 10. The purpose of condenser 11a is phasing i. e. to effect a desired phase to the alternating current signal resulting from bridge unbalance in one voltage direction and a 180° out-of-phase signal resulting from bridge unbalance in the opposite voltage direction. Suppressor grid 11 of pentode P is connected via lead 12 to cathode 13 which is, in turn, connected to ground level via bias resistor 14 and by-pass condenser 15; screen grid 16 is connected to voltage divider V, comprising resistor 17 and neon lamp 18; the purpose of voltage divider V is to maintain a relatively constant voltage on screen grid 16.

Plate 19 is supplied with sufficient voltage from 500 volt center-tapped transformer $X_1$ via lead 20, rectifier 21 and smoothing filter $F_1$, comprising resistor 21a and parallel condensers 22 and 23, and via plate resistor 24. The amplified output (approximately 200 times) from pentode P is conveyed via lead 25 and coupling condenser 26 to control grid 27 of thyratron N—a type 2D21, for example.

It is to be noted that greater sensitivity can be obtained for the invention merely by changing from conventional to "starved" amplifier operation i. e. by effectively increasing amplifier gain. This result can be achieved by altering the magnitude of resistor 24 e. g. from 150K to 3M, for example, and by dropping the voltage on screen grid 16 to a lower magnitude than the voltage on plate 19 (10% or less of plate voltage) e. g. by substituting a 5K or lower resistance for neon lamp 18. Resistance 14 is altered to supply proper tube bias for symmetrical amplification of an alternating current millivolt signal from bridge B. Owing to increased gain resulting from such alteration in amplifier A, small temperature changes can be relayed by temperature sensing element T. In fact, with such an arrangement, it is estimated that the temperature of a liquid bath, for example, could be controlled within a tolerance of ±.01° F.

Direct current grid bias is supplied to thyratron N from transformer $X_1$ via lead 28, rectifier 29, smoothing filter $F_2$ comprising resistor 30 and parallel condensers 31 and 32, bias potentiometer 33, lead 34 and bias resistor 35. Suppressor grid 36 is connected to ground via lead 37. As was previously mentioned, the conduction status of thyratron N is dependent upon the phase of the signal appearing on grid 27. Assuming control potentiometer $R_c$ is adjusted to a higher magnitude resistance than that of balancing resistance $R_s$, the resulting voltage appearing on control grid 27 is in phase with the voltage appearing on plate 38 owing to the phase shift action of condenser 11a; consequently thyratron N fires; the resulting current flow is conveyer via lead 39 to relay coil 40, thus closing switches 41 and 42 which energize neon indicator lamp 43 and turn "on" a heater (not shown) via leads 44 and 45, respectively. Condenser 46 serves as a "hold-in" condenser for relay coil 40, supplying voltage thereto during the negative half-cycle of the alternating current wave. Resistor 53 limits peak thyratron plate current. Resistor 47 provides current limiting resistance for the neon lamp which is connected in series with leads 48 and 49 which are connected to a 115 volt, 60 cycle source. The purpose of fuse 50 is, of course, circuit protection in case of overload. Transformer winding $X_2$ supplies 6.3 volt, 60 cycle alternating current to bridge circuit B (terminals 3 and 4) and to heaters 51 and 52 of pentode P and thyratron N, respectively, as leads y and $y^1$ indicate.

Preferred magnitudes of components utilized in this specific embodiment of the invention are as follows:

Resistor R—100 Ω (wire wound)
Resistor $R_{c_1}$—50 Ω (wire wound)
Resistor $R_{c_2}$—200 Ω (wire wound) (10 turn potiometer)
Condenser 11—Adjust to secure zero phase shift from plate to gride of thyratron N.
Condenser 15—25 mfd., 25 v. D. C.
Resistor 14—750 Ω, ½ watt
Resistor 24—150K, ½ watt
Resistor 17—110K, ½ watt
Lamp 18—NE-2 (or NE51)
Condenser 26—.1 mfd., 400 v.
Resistor 35—240K, ½ watt
Resistor 33—10K (carbon potentiometer)
Condenser 31—4 mfd., 450 v.
Condenser 32—4 mfd., 450 v.
Resistor 30—110K, ½ watt
Resistor 21—47K, ½ watt
Condenser 22—4 mfd., 450 v.
Condenser 23—4 mfd., 450 v.
Resistor 52—2K, 10 watt
Lamp 43—Ne 51
Resistor 47—200K, ½ watt
Condenser 46—10 mfd., 150 v. D. C.

It is to be understood that the invention is not limited to the embodiment herein described but that it encompasses all modifications and variations within the legitimate and valid scope of the appended claims.

What is claimed is:

1. A temperature control circuit, comprising: a Wheatstone bridge circuit including a first branch having two adjacent arms, each having a resistor therein, the magnitude of both these resistors being substantially equal, and a second branch having two adjacent arms, a first arm including a control potentiometer and the second arm including a balancing resistor; a temperature sensing element controlling the magnitude of said balancing resistor; means for applying an alternating voltage across said two branches of said Wheatstone bridge circuit; an output from said Wheatstone bridge circuit, said output being taken from a node between said control potentiometer and said balancing resistor to the opposite node of said bridge; a voltage gain transformer connected to said output; a pentode, the control grid and cathode of which are adapted to be connected to the output of said voltage gain transformer; a phasing condenser connected to said control grid for providing a desired phase adjustment to the alternating current signal resulting from bridge unbalance in one voltage direction, and a 180° out-of-phase signal resulting from bridge unbalance in the opposite voltage direction; a resistor of high resistance connecting the plate of said pentode to a plate supply voltage; a voltage divider connected to a screen grid in said pentode for maintaining said screen grid at a stable low potential; a thyratron having a connection from a control grid thereof to the plate of said pentode; means for providing D. C. bias on said thyratron grid; a relay coil connected in the plate circuit of said thyratron; and a plurality of switches actuated by said relay coil, said switches being connected to a temperature controlled device, whereby said device is governed by bridge unbalance resulting from temperature variations sensed by said temperature sensitive element.

2. Apparatus in accordance with claim 1 including a calibrated dial connected to said control potentiometer for temperature adjustment of said control potentiometer.

3. Apparatus in accordance with claim 1 in which said temperature sensing element is an extremely sensitive type resistance probe.

4. Apparatus in accordance with claim 1 in which said voltage divider comprises a resistor and a neon lamp.

5. Apparatus in accordance with claim 1 in which said temperature controlled device is a heater.

References Cited in the file of this patent

UNITED STATES PATENTS

| | | |
|---|---|---|
| 2,275,317 | Ryder | Mar. 3, 1942 |
| 2,519,789 | Perkins | Aug. 22, 1950 |
| 2,525,016 | Borell | Oct. 10, 1950 |
| 2,556,065 | Callendar | June 5, 1951 |
| 2,635,225 | Hadady | Apr. 14, 1953 |